United States Patent [19]

Behle

[11] 4,268,010
[45] May 19, 1981

[54] OPERATING HANDLE FOR BOTTOM OPERATED RAILWAY TANK CAR VALVE

[75] Inventor: Gunter R. Behle, St. Charles, Mo.

[73] Assignee: ACF Industries, Inc., New York, N.Y.

[21] Appl. No.: 112,039

[22] Filed: Jan. 14, 1980

Related U.S. Application Data

[62] Division of Ser. No. 955,966, Oct. 30, 1978.

[51] Int. Cl.³ .................. F16K 31/60; F16K 35/00
[52] U.S. Cl. .................................. 251/144; 251/230; 251/89
[58] Field of Search .............. 251/144, 230, 89, 296; 81/62, 63, 63.1, 63.2; 137/347, 350

[56] References Cited

U.S. PATENT DOCUMENTS

| | | | |
|---|---|---|---|
| 1,099,077 | 6/1914 | Wray | 137/385 |
| 1,563,554 | 12/1925 | Campbell | 251/144 |
| 2,943,523 | 7/1960 | Gray et al. | 81/62 X |
| 3,490,317 | 1/1970 | Rozmus | 81/62 |
| 4,095,494 | 6/1978 | Costoe | 81/63.2 |
| 4,124,193 | 11/1978 | Reedy et al. | 251/144 |

FOREIGN PATENT DOCUMENTS 512701  1/1921  France ................. 137/383

*Primary Examiner*—William R. Cline
*Attorney, Agent, or Firm*—Henry W. Cummings

[57] ABSTRACT

In a railway tank car bottom outlet lading valve assembly, an operating handle assembly for the lading valve includes an operating shaft extending vertically within a lading outlet chamber. The shaft is provided with a non-round shaft tool connection portion near the bottom thereof. An operating handle is pivotably mounted on the outlet chamber adjacent the non-round connection portion. The operating ratchet includes a handle non-round connection portion which engages the shaft non-round connection portion. A handle-storing bracket for the distal end of the operating handle is mounted upon the tank body or on an upper mounting flange portion of the outlet chamber adjacent a tank car bottom outlet mounting flange. The bracket is preferably U-shaped and includes a removable pin extending between opposite arms of the U-shaped bracket. When the pin is removed from the mounting bracket, the handle may be pivoted to a generally horizontal position to rotate the shaft through engagement of the handle non-round portion with the shaft non-round portion, and thus move the lading valve between open and closed positions. After use, the distal end of the handle may be returned to the stored position in the handle storing bracket with the pin back in place.

6 Claims, 9 Drawing Figures

OPERATING HANDLE FOR BOTTOM OPERATED RAILWAY TANK CAR VALVE

This is a division of application Ser. No. 955,966, filed Oct. 30, 1978.

BACKGROUND OF THE INVENTION

This invention relates to a handle assembly for a railway tank car bottom outlet lading valve.

The tools normally used to open tank car bottom outlet valves include pipe wrenches and pipe extensions. While normally such tools are available at unloading sites, occasionally the unloading operator will have difficulty finding a suitable unloading tool at the yard.

Furthermore, in some instances improper use of these unloading tools has resulted in damage to the bottom outlet valve operating assembly. In particular the use of standard pipe wrenches to rotate a hexagon tool connection portion tends to round the hexagon connection portion, gradually making it more difficult to rotate as the hexagon edges become more rounded.

SUMMARY OF THE INVENTION

In a railway tank car bottom outlet lading valve assembly, an operating handle assembly for the lading valve includes an operating shaft extending vertically within a lading outlet chamber. The shaft is provided with a non-round shaft tool connection portion near the bottom thereof. An operating handle is pivotably mounted on the outlet chamber adjacent the non-round connection portion. The operating handle includes a handle non-round connection portion which engages the shaft non-round connection portion. A handle-storing bracket for the distal end of the operating handle is mounted upon an upper mounting flange portion of the outlet chamber adjacent a tank car bottom outlet mounting flange or upon the tank itself. The bracket is preferably U-shaped and includes a removable pin extending between opposite arms of the U-shaped bracket. The handle connection portion is preferably maintained in place adjacent the non-round shaft connection portion by a threaded handle support which engages an externally threaded portion of the valve operating shaft. When the pin is removed from the mounting bracket, the handle may be pivoted to a generally horizontal position to rotate the shaft through engagement of the handle non-round portion with the shaft non-round portion, and thus move the lading valve between open and closed positions. After use, the distal end of the handle may be returned to the stored position in the handle-storing bracket with the pin back in place. The handle connection portion comprises a ratchet and pawl arrangement which engages the shaft connection portion.

THE DRAWINGS

DESCRIPTION OF THE PREFERRED EMBODIMENTS

Figure 1:
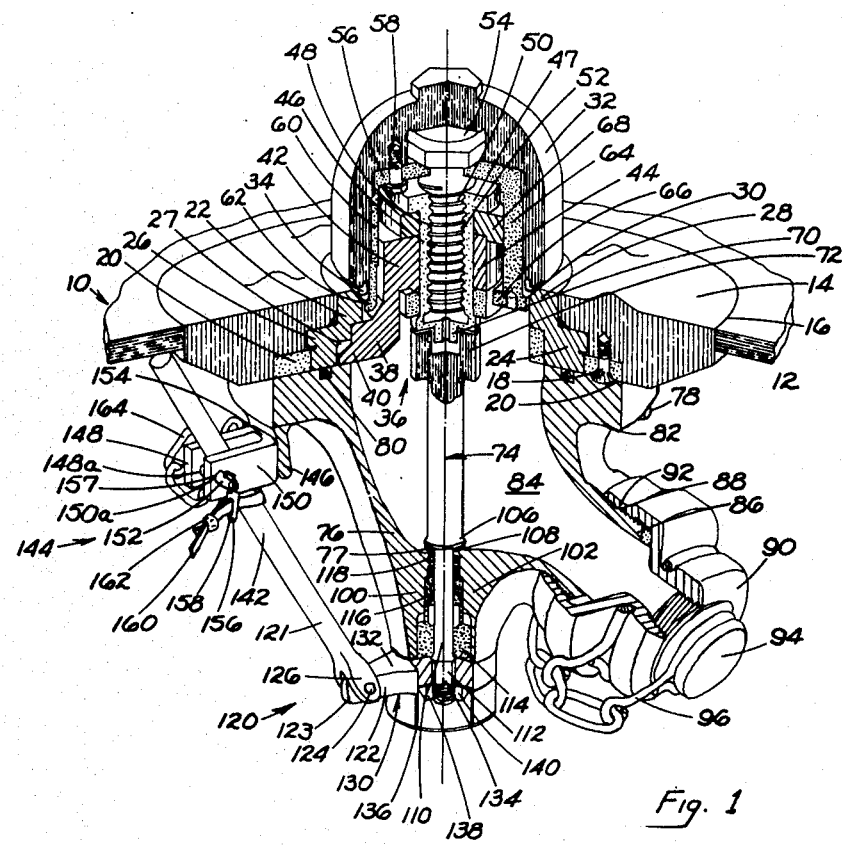
FIG. 1 is a vertical perspective view, partly in section, of one embodiment of the handle assembly of the present invention, and illustrating a valve closure assembly which may be used with the handle asssembly.

In the drawings a railway tank car 10 includes a tank bottom 12. A tank car mounting flange 14 is welded to an opening 16 in the tank bottom. Countersunk fasteners 18 extending into mounting flange 14 hold in place a valve seat retainer 20.

A valve seat memeber 22 includes a body portion 24 having an outwardly extending flange 26, the lower portion of which is engaged by the seat retainer 20. An upper valve seat portion 28 includes an inclined valve seat surface 30. A valve closure 32 having a seal 34 is movable vertically relative to valve seat portion 28 by means of an operating assembly indicated generally at 36.

While a wide variety of operating assemblies may be used, one suitable operating 36 includes a retainer 38 having outwardly extending lugs 40 which engage slots 27 in valve seat member 22, and an upper radial portion 42 which terminates in a hub 44 which engages a vertically extending upper operator 46. Upper operator 46 includes an upper flange 47, is internally threaded at 48, and engages a depending closure shaft 50 which is externally threaded at 52.

Closure shaft 50 includes a head portion 54 which is maintained in place within closure 32 by a depending member 56 which engages the lower surface of head 54 and which is held in position by fasteners 58. Depending member 56 includes a cylindrical portion 60 having outwardly directed flanges 62 which hold in place seal member 34. Cylindrical portion 60 further includes portions 64 of increased cross section having inwardly directed flanges 66 which in open position engage stops 68 located between hub 44 and flange 47 of upper operating shaft 46.

Shaft 46 further includes a lower non-round engagement portion 70 which is adapted to be engaged by a cooperating non-round connection portion 72 of a vertically extending operating shaft 74 located in a depending outlet chamber 76. Fasteners 78 located in a flange portion 82 of outlet chamber 76 hold outlet chamber 76 and a seal 80 in engagement with seat retainer 20 as is disclosed in greater detail in U.S. Pat. No. 4,141,535 issued Feb. 27, 1979 and U.S. Pat. No. 4,124,193 issued Nov. 7, 1978; U.S. Pat. No. 4,158,453 issued June 9, 1979; and U.S. Pat. No., 4,198,032 issued Apr. 15, 1980, each of which is incorporated into the present application by this reference.

Outlet chamber 76 is hollow having an opening 84 and an unloading spout 86. Unloading spout 86 is externally threaded as indicated at 88 and is adapted to receive a cap 90 having cooperating threads 92 and a threaded closure plug 94. A retaining chain 96 is also provided.

Outlet chamber 76 further includes an operating portion 100 having a bore 102 within which operating shaft 74 extends. Operating shaft 74 includes a shoulder 77 resting on a cooperating shoulder 108 in operating portion 100 and further includes a lower depending shaft portion 110. Depending shaft portion 110 includes a non-round connection portion 112. A retainer 114 located above connection portion 112 holds in place a packing 116 and an O-ring seal 118.

The handle assembly of the present invention is indicated generally at 120. A handle 121 includes a mounting lug 122 having a vertical turning stop 123 which receives a pin 124 which passes through bifurcated end portion 126 of handle 120. Handle connection portion 130 includes a body portion 132 having a formed non-round opening 134 of a non-round contour adapted to drivingly engage the non-round contour 112 on shaft 74. The respective non-round contours may be square, hexagon, octagon, etc. Connection portion 130 is supported by a lower theft- and tamper-proof support member 136 which engages external threads 140 located on the bottom portion of shaft 110.

Handle 121 includes a distal end portion 142. A bracket indicated generally at 144 is mounted upon an extension 146 of mounting flange 82. Alternatively, the bracket may be attached directly to the tank itself. If space permits, taking into account the length of handle 121, bracket 144 may be mounted directly on flange 82. Bracket 144 includes a pair of bracket arms 148 and 150 having openings therein 148a and 150a which receive a pin 152. A connecting web portion 154 of bracket 144 is welded to extension 146. Pin 152 includes a keeper 156 extending into a slot 157 in pin 152. Keeper 156 includes a slot 158 which is adapted to receive a car seal 160. Seal 160 is also wrapped around handle 121 and the ends are held together with a crimped connector 162. A chain 164 is attached to the opposite end of pin 152. When pin 152 is removed, the chain may be attached to any convenient place on bracket 144 to prevent the loss of pin 152.

To remove pin 152, crimped connector 162 is first removed from car seal 160, and keeper 156 is removed from slot 157. Pin 152 may then be removed through arms 148 and 150. This frees the distal end 142 of handle 121. The distal end is then pivoted about pin 124 to a generally horizontal position, or slightly below horizontal, sufficient to clear unloading spout 86 and cap 90. Stop 123 prevents handle 121 from pivoting considerably in excess of the horizontal position. The handle may then be used to rotate shaft 74 through engagement of the respective non-round connection portions 134 and 114. As is described in greater detail in said U.S. Pat. Nos. 4,141,535; 4,124,193; 4,158,453; and 4,198,032, rotation of shaft 74 will cause valve closure 32 to move between open and closed positions depending upon the direction of rotation. If lading is to be loaded or unloaded, cap 90 is first removed from unloading spout 92.

After use the distal end 142 of handle 121 may be returned to the stored position within bracket 144 with pin 152 extending through arms 148 and 150 with keeper 156 in place and optionally including car seal 162, without regard to shaft position.

It will be apparent that this construction enables the operator in the rail yard to have a readily available operating handle to open and close valve closure 32. Thus the occasional problem of lack of availability of a suitable tool to open and close the lading valve is avoided by the present invention. Furthermore, since the non-round connecting portion 134 is designed to cooperate with the non-round portion 114 of shaft 74, the likelihood of damage to the non-round connection portion of the shaft and to the valve closure operating assembly is reduced. Subsequent leakage is also reduced.

It is also to be noted that the handle 121 may be returned to the stored position with the valve in the open or partly open position if this is desired by the operator.

Figure 2:
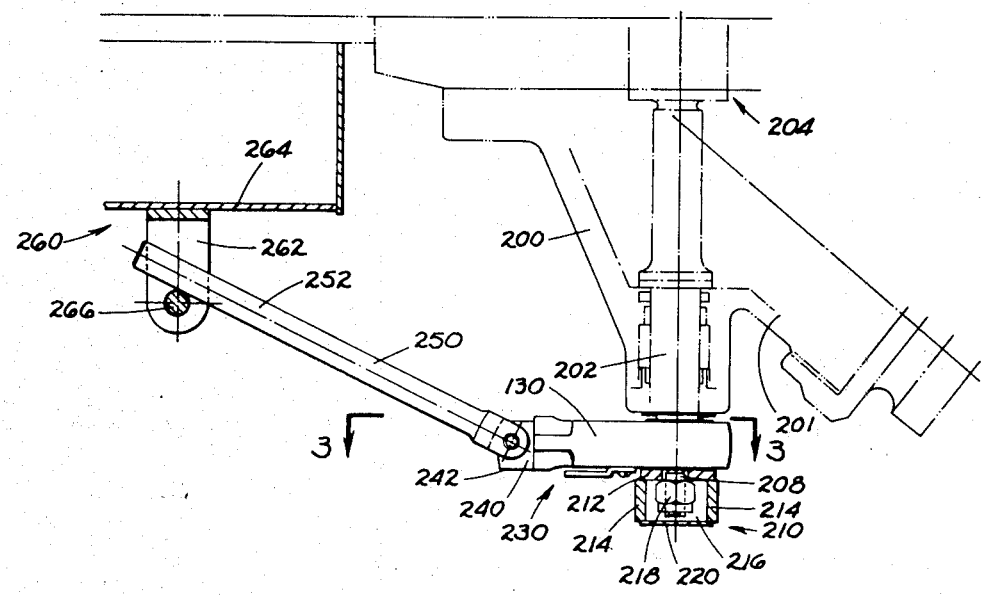
FIG. 2 is a vertical sectional view of another embodiment of the handle assembly of the present invention.

Another embodiment of the present invention is shown in FIG. 2. In this embodiment an outlet chamber 200 is provided including an unloading spout 201 provided with a vertical operator 202 similar to operator 110 in FIG. 1. Operator 202 is connected to a valve closure assembly 204 constructed in the same manner as illustrated in FIG. 1.

Operator 202 extends below the housing as indicated at 208. A theft- and tamper-proof nut cover assembly indicated generally at 210 includes an upper plate 212 having an opening 213 and a cylindrical portion 214 welded to plate 212, as illustrated in FIG. 2. When nut cover assembly 210 is applied to shaft portion 208, the bottom 216 is open and nut 218 is applied to hold the assembly 210 in place. Following application of nut 218, a bottom plate 220 is welded to cylindrical portion 214 to prevent the nut from backing off in service, and thereby losing the operating handle, and to prevent access from the outside to the nut 218.

Figure 3:
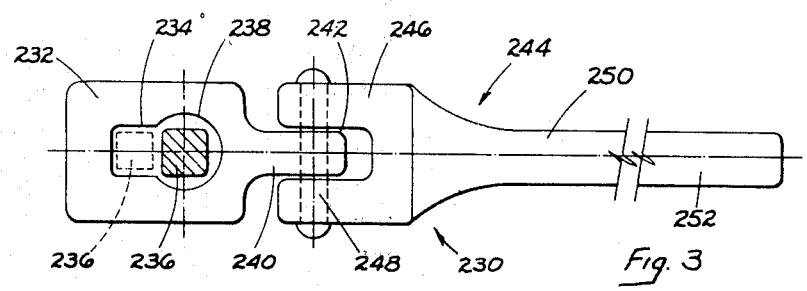
FIG. 3 is a sectional view looking in the direction of the arrows along the line 3—3 in FIG. 2.
Figure 4:
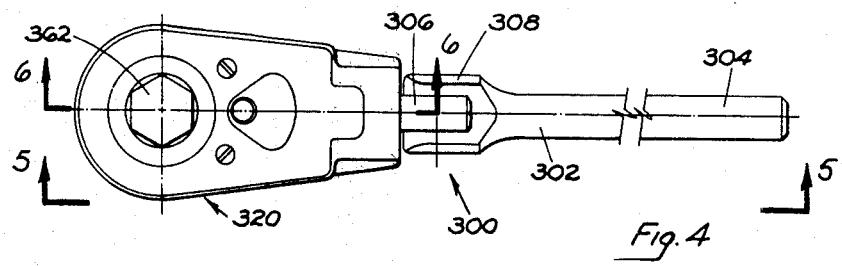
FIG. 4 is a view similar to FIG. 3 of another embodiment of the invention illustrating a ratchet handle assembly.
Figure 5:
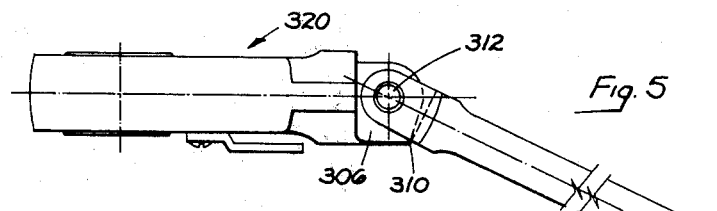
FIG. 5 is a side elevation view looking in the direction of the arrows along the line 5—5 in FIG. 4.

A handle assembly 230 includes a connection portion 232, illustrated in FIG. 3, having a formed key slot 234 formed therein. Connection portion 232 is movable back and forth along plate 212 (FIG. 2). Operator 202 includes a square portion 236 located within slot 234. In the disengaged position, square portion 236 is located in the semi-circular portion 238 of slot 234. In the engaged position, connection portion 232 is movable relative to square portion 236, to the position shown dotted in FIG. 3. Handle assembly 230 further includes a mounting lug 240 extending outwardly from connection portion 232 and having a stop surface 242 located thereon. A handle indicated generally at 244 includes a bifurcated end portion 246 which is held in engagement with mounting lug 240 by means of a pin 248. Handle 244 includes a shaft 250 extending outwardly from bifurcated portion 246. The distal end 252 of handle 250 may be held in place by means of bracket assembly 144 as illustrated in FIG. 1. Alternatively, as shown in FIG. 2, a bracket assembly of the type shown at 260 may be utilized. Bracket assembly 260 includes a generally U-shaped member 262 which is welded to the tank bottom 264. U-shaped bracket 262 has a pin 266 which passes through openings in the respective legs of the bracket. Pin 266 is removable in the same manner as is pin 152 in FIG. 1.

When pin 266 is removed, the distal end 252 of handle 250 may be pivoted to a generally horizontal position whereby the handle may be used to move connection portion 232 from the position shown in solid lines to the position shown dotted in FIG. 3. In this position, the handle may be utilized to rotate the operating shaft 202 and move a valve closure similar to the valve closure shown in FIG. 1 between open and closed positions.

It is to be noted that handle 250 is dimensioned such that, in the engaged position, handle 250 and connection portion 232 cannot be moved laterally because, if such movement were attempted, the handle would abut the tank bottom. Thus, the bracket 260, in addition to providing a place for the handle, also prevents the handle from assuming the engaged position in transit.

In other respects, the embodiment shown in FIGS. 2 and 3 operates in the same manner as the embodiment shown in FIG. 1.

Another embodiment of the present invention is shown in FIGS. 4 through 8. This embodiment indicated generally at 300 includes a handle 302 having a distal end 304. A mounting lug 306 aligns with bifurcated end portion 308 of the handle. A pin 312 extends between the bifurcated end and the mounting lug, and a vertical stop 310 is provided on the mounting lug.

Figure 6:
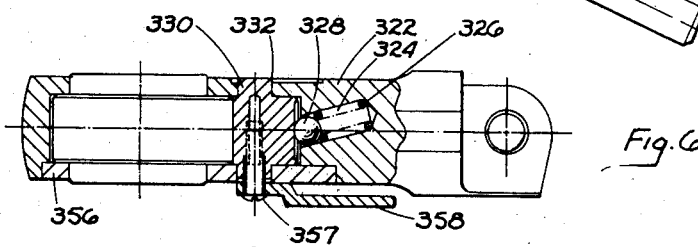
FIG. 6 is a vertical sectional view looking in the direction of the arrows along the line 6—6 in FIG. 4.
Figures 7, 8:
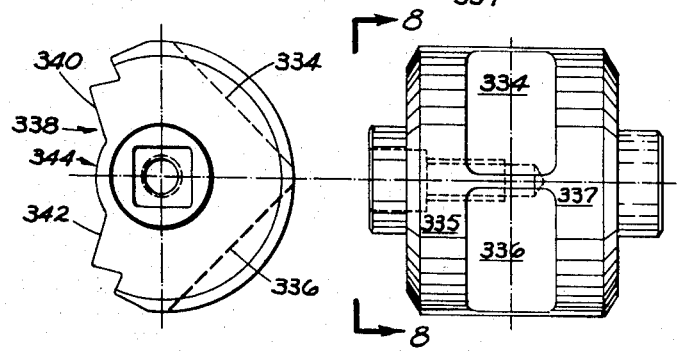
FIG. 7 is a detail view of the pawl used in the ratchet assembly of FIGS. 4–6.
FIG. 8 is an elevation view looking in the direction of the arrows along the line 8—8 in FIG. 7.
Figure 9:
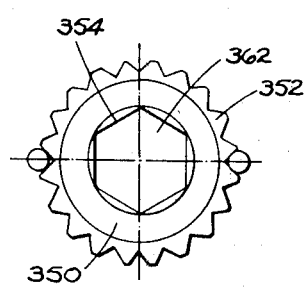
FIG. 9 is a detail view of the ratchet gear used in the ratchet assembly shown in FIGS. 4–6.

A ratchet assembly 320 is integrally connected to mounting lug 306. As shown in FIG. 6, the ratchet includes a body portion 322, having a slot 324 that receives a spring 326. Spring 326 engages a ball 328. A pawl 330 is mounted within a bore 332 in the body portion 322. The pawl includes a pair of right angular surfaces 334 and 336 between circular portions 335 and 337, either of which is adapted to be engaged by ball 328. A pawl contour 338 includes a pair of projections 340 and 342 and a cut-out portion 344.

Ratchet body portion 322 further includes a ratchet gear 350 having a plurality of ratchet teeth 352 on its external surface. The internal surface of ratchet gear 350 is hexagon-shaped as indicated at 354. A cover plate 356 engages the lower surface of ratchet gear 350 and pawl 330. Pawl 330 is pivotable about a screw 357 by means of a handle or reversing lever 358. Ratchet assembly 320 is mounted on the outlet chamber in the same manner as assembly 230 in FIG. 2. The distal end 304 of handle 302 engages a mounting bracket of the type shown at 144 in FIG. 1 or of the type shown at 260 in FIG. 2. In this embodiment the operating shaft portion 362 is hexagon-shaped to cooperate with the hexagon shape of ratchet gear 350. By means of handle 302 the operator can rotate shaft 362 in a given direction and one of the projections 340 slidingly engages teeth 352 to prevent the rotation of the ratchet gear 350 in operator 362 other than in the desired direction. By rotation of handle 358 the opposite projection 342 of the pawl engages the teeth 352 and by means of handle 302, the operator can then rotate a ratchet wheel 350 and operating shaft 362 in the opposite direction.

It is noted that ratchet assemblies of this type are available on the open market. A suitable ratchet may be purchased from Snap-on Tools Corporation; Kenosha, Wis.

What is claimed is:

1. In a railway tank car bottom outlet lading valve assembly, an operating handle assembly for the lading valve comprising:

an outlet chamber extending vertically below said lading valve and having a spout having a center line which makes an angle of significantly less than 90° with respect to the horizontal; said spout having a removable cap at its lower out end; an operating shaft extending vertically within said outlet chamber having a non-round shaft connection portion near the bottom thereof; an operating handle pivotably mounted adjacent said shaft non-round connection portion; said handle having a handle connection portion including a ratchet assembly for engaging said shaft non-round connection portion; a handle-storing bracket for the distal end of the operating handle mounted above said shaft connection portion adjacent the tank car bottom; and removable keeper means separate from said removable cap for maintaining the distal end of said handle within said bracket, whereby said removeable keeper means may be removed both when said cap is removed and when said cap remains in place on said spout, and said handle may be pivoted to a generally horizontal position wherein said handle is unobstructed by said spout and is rotatable to rotate said handle connection portion and said shaft through engagement of said ratchet assembly with said shaft connection portion, and thus move the lading valve between open and closed positions.

2. An operating handle assembly according to claim 1 wherein said bracket is U-shaped and includes a removable pin extending between opposite arms of the bracket.

3. An operating rod assembly according to claim 1 wherein said handle connection portion includes a stop to prevent rotation of said handle substantially beyond a horizontal position.

4. An operating handle assembly according to claim 3 wherein said ratchet assembly includes a pawl which is pivotable to a first position allowing rotation of said shaft in a first direction and is pivotable to a second position allowing rotation of said shaft in the opposite direction.

5. An operating handle assembly according to claim 1 wherein said bracket is mounted on the tank bottom.

6. An operating handle assembly according to claim 1 wherein said bracket is located in a direction away from said discharge spout.

* * * * *